United States Patent
Ono et al.

(10) Patent No.: US 11,271,663 B2
(45) Date of Patent: Mar. 8, 2022

(54) MOBILE TERMINAL TEST SYSTEM

(71) Applicant: ANRITSU CORPORATION, Kanagawa (JP)

(72) Inventors: Kota Ono, Kanagawa (JP); Takeo Nomura, Kanagawa (JP); Atsushi Usui, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 104 days.

(21) Appl. No.: 16/993,723

(22) Filed: Aug. 14, 2020

(65) Prior Publication Data

US 2021/0099238 A1 Apr. 1, 2021

(30) Foreign Application Priority Data

Sep. 30, 2019 (JP) .............................. JP2019-180080

(51) Int. Cl.
*H04B 17/00* (2015.01)
*H04L 69/04* (2022.01)
*H04W 12/037* (2021.01)

(52) U.S. Cl.
CPC ......... *H04B 17/0085* (2013.01); *H04L 69/04* (2013.01); *H04W 12/037* (2021.01)

(58) Field of Classification Search
CPC ... H04B 17/0085; H04W 12/037; H04L 69/04
See application file for complete search history.

(56) References Cited

U.S. PATENT DOCUMENTS

| | | | | |
|---|---|---|---|---|
| 9,766,270 | B2* | 9/2017 | Heydron | G01R 1/06788 |
| 2005/0182583 | A1* | 8/2005 | Miyazaki | G01R 31/31907 |
| | | | | 702/117 |
| 2006/0012388 | A1* | 1/2006 | Lin | H04W 24/00 |
| | | | | 324/754.08 |
| 2008/0297165 | A1* | 12/2008 | Kurihara | G01R 31/31924 |
| | | | | 324/537 |

(Continued)

FOREIGN PATENT DOCUMENTS

JP 4686532 B2 5/2011

OTHER PUBLICATIONS

"Advancement of 4th generation mobile communication systems (LTE-Advanced), etc." The Ministry of Internal Affairs and Communications' website.<www.soumu.go.jp/main_content/000397030. pdf, NTT Docomo, Inc., Jan. 29, 2016.

*Primary Examiner* — Dominic E Rego
(74) *Attorney, Agent, or Firm* — Pearne & Gordon LLP

(57) ABSTRACT

In response to a command from the control PC 4, the first mobile terminal test apparatus 2 compresses data of test signals including a first test signal and a second test signal which are generated and encrypted, and adds a restoration parameter to a header of the compressed data. The second mobile terminal test apparatus 3 acquires the restoration parameter-added compressed data at the second port 3a via the cable 5 from the first port 2a, and restores and encrypts the data of test signals before encryption, based on the restoration parameters. Under the control of the control PC 4, the first mobile terminal test apparatus 2 outputs the data of the first test signal to the device under test W, and the second mobile terminal test apparatus 3 outputs the data of the second test signal to the device under test W.

4 Claims, 3 Drawing Sheets

(56) References Cited

U.S. PATENT DOCUMENTS

| | | | | |
|---|---|---|---|---|
| 2009/0066359 A1* | 3/2009 | Smith | ................ | G01R 31/3163 |
| | | | | 324/762.08 |
| 2009/0079438 A1* | 3/2009 | Nurmi | .................... | G01R 31/66 |
| | | | | 324/538 |
| 2009/0322369 A1* | 12/2009 | Song | ...................... | G11C 29/56 |
| | | | | 324/754.06 |
| 2012/0196633 A1* | 8/2012 | Suetsugu | ................ | H04L 51/04 |
| | | | | 455/466 |
| 2013/0183898 A1* | 7/2013 | Strid | ...................... | H02J 50/12 |
| | | | | 455/41.1 |
| 2013/0266044 A1* | 10/2013 | Tamura | .................... | H04L 7/00 |
| | | | | 375/211 |
| 2015/0091594 A1* | 4/2015 | Hamilton | ................ | G01R 1/07 |
| | | | | 324/750.01 |
| 2017/0001427 A1* | 1/2017 | Krogdahl | ............ | H04M 1/0202 |
| 2017/0317769 A1* | 11/2017 | Kong | ...................... | H04B 17/29 |
| 2018/0219636 A1* | 8/2018 | Gale | ...................... | H04B 17/26 |
| 2020/0025799 A1* | 1/2020 | Vedagarbha | ............ | G01R 31/26 |

* cited by examiner

MOBILE TERMINAL TEST SYSTEM

TECHNICAL FIELD

The present invention relates to a mobile terminal test system which performs a test for evaluating the performance of a mobile terminal such as a mobile phone.

BACKGROUND ART

For example, when a mobile terminal such as a mobile phone has been developed, it is necessary to test whether or not the developed mobile terminal can normally perform communication. For this reason, for example, a mobile terminal test apparatus operating as a pseudo base station that simulates the function of an actual base station as disclosed in Patent Document 1 below is used.

The mobile terminal test apparatus disclosed in Patent Document 1 connects to a mobile terminal to be tested, performs communication with the mobile terminal, and evaluates performance of the mobile terminal through a test for checking the contents of the communication.

However, the throughput defined in Long Term Evolution (LTE), which is the communication standard for mobile phones, has been greatly improved from around 2015 to the present. Specifically, as shown in Non-Patent Document 1 below, it is 370 Mbps in 2016, but it has tripled to 1288 Mbps in 2018 (URL <https://www.nttdocomo.co.jp/info/news Release/2018/10/17_00.html>).

The LTE standard that defines the throughput is disclosed in the URL <https://portal.3gpp.org/desktopmodules/Specifications/SpecificationDetails.aspx?specificationId=2434>.

RELATED ART DOCUMENT

Patent Document

[Patent Document 1] Japanese Patent No. 4686532

Non-Patent Document

[Non-Patent Document 1] Ministry of Internal Affairs and Communications. Regarding the advancement of 4th generation mobile communication systems (LTE-Advanced), etc. The Ministry of Internal Affairs and Communications' website. <www.soumu.go.jp/main content/000397030.pdf>

DISCLOSURE OF THE INVENTION

Problem that the Invention is to Solve

As described above, in recent years, the amount of data to be handled has been increasing along with the update of the communication standard, and in the above-described single mobile terminal test apparatus in the related art, the amount of data required by the communication standard is significantly large, the physical bandwidth is insufficient, and hardware performance could not keep up, so that there is a problem that it is not possible to cope with a test of a mobile terminal having a large data amount.

Therefore, the present invention has been made in view of the above problems, and an object is to provide a mobile terminal test system capable of coping with a test of a mobile terminal having a large data amount.

Means for Solving the Problem

In order to achieve the above object, a mobile terminal test system according to claim 1 of the present invention is a mobile terminal test system including a first mobile terminal test apparatus that outputs a first test signal to a device under test;

a second mobile terminal test apparatus that outputs a second test signal to the device under test; and a control PC that controls the first mobile terminal test apparatus and the second mobile terminal test apparatus, the mobile terminal test system transmitting test signals including the first test signal and the second test signal to the device under test, wherein a first port of the first mobile terminal test apparatus and a second port of the second mobile terminal test apparatus are connected via a cable, wherein the first mobile terminal test apparatus includes a data generation unit that generates data of the test signals to be shared between the first mobile terminal test apparatus and the second mobile terminal test apparatus, in response to a command from the control PC, a data compression unit that compresses the data output from the data generation unit to create compressed data, and a parameter adding unit that adds, to a header of the compressed data, a restoration parameter for restoring the data and outputs the compressed data to the first port, wherein the second mobile terminal test apparatus includes a data acquisition unit that acquires the compressed data to which the restoration parameter is added, at the second port via the cable from the first port of the first mobile terminal test apparatus, and a data restoration unit that removes the restoration parameter from the restoration parameter-added compressed data acquired by the data acquisition unit, and restores the data of the test signals, based on the restoration parameter.

A mobile terminal test system according to claim 2 of the present invention is the mobile terminal test system according to claim 1, wherein the first mobile terminal test apparatus outputs, to the device under test, only data as instructed by the control PC, out of the data of the test signals generated by the data generation unit, as data of the first test signal, in a determined order and at an output timing, and wherein after the data of the first test signal is output from the first mobile terminal test apparatus to the device under test in the determined order and at the output timing, the second mobile terminal test apparatus outputs only data as instructed by the control PC, out of the data of the test signals restored by the data restoration unit, as data of the second test signal, to the device under test, in a determined order and at an output timing.

A mobile terminal test system according to claim 3 of the present invention is the mobile terminal test system according to claim 1, wherein the first mobile terminal test apparatus further includes a first data encryption unit that encrypts the data of the test signals generated by the data generation unit, wherein the data compression unit compresses the data of the test signals encrypted by the data encryption unit, and wherein the second mobile terminal test apparatus further includes a second data encryption unit that encrypts the data of the test signals restored by the data restoration unit.

The mobile terminal test system according to claim 4 of the present invention is the mobile terminal test system according to claim 3, wherein the first mobile terminal test apparatus outputs, to the device under test, only data as instructed by the control PC, out of the data of the test signals generated by the data generation unit and encrypted by the first data encryption unit, as data of the first test signal, in a determined order and at an output timing, and wherein after the data of the first test signal is output from the first mobile terminal test apparatus to the device under test in the determined order and at the output timing, the second mobile terminal test apparatus outputs only data as instructed by the control PC, out of the data of the test signals encrypted by the second data encryption unit, as data of the second test signal, to the device under test, in a determined order and at an output timing.

Advantage of the Invention

According to the present invention, since it is possible to reduce the data transmission amount of a cable having a physically limited communication capacity, a plurality of mobile terminal test apparatuses can be connected without any problem, and a large-capacity throughput test can be realized.

BEST MODE FOR CARRYING OUT THE INVENTION

Hereinafter, embodiments for carrying out the present invention will be described in detail with reference to the accompanying drawings.

A mobile terminal test system according to the present invention performs a test for evaluating the performance of a mobile terminal by simulating a base station, with a mobile terminal such as a mobile phone as a device under test, for example, inputs, for example, as one of the performance evaluations, a test signal based on a fixed pattern (for example, All "0", All "1") predetermined according to a scenario to a mobile terminal, and performs a large-capacity throughput test, based on the presence or absence of a response.

Figure 1:
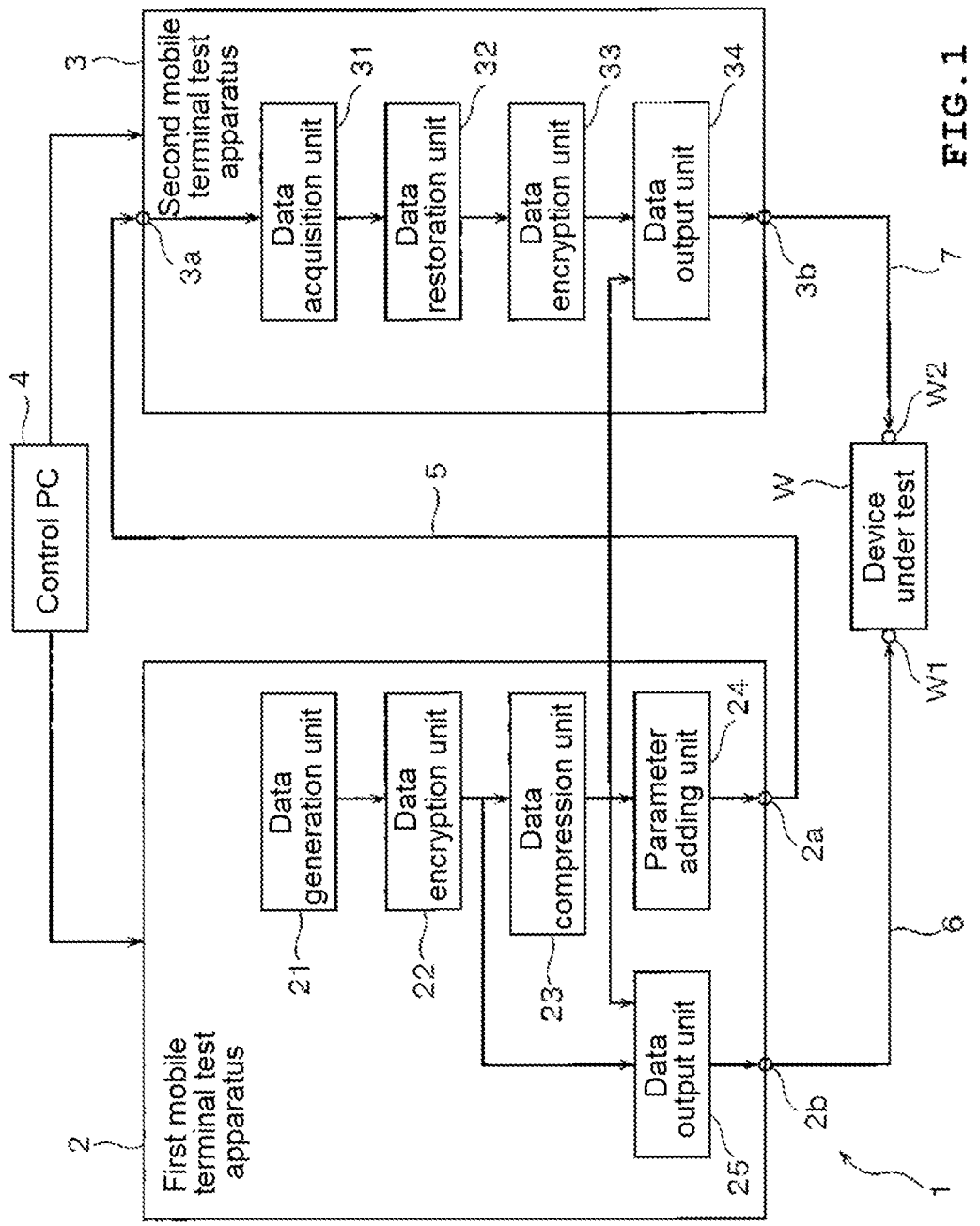
FIG. 1 is a block diagram of a mobile terminal test system according to the present invention.

As shown in FIG. 1, the mobile terminal test system 1 of the present embodiment is schematically configured including a first mobile terminal test apparatus 2, a second mobile terminal test apparatus 3, and a control PC 4 in order to perform a test for evaluating the performance of a device under test W (mobile terminal).

[Configuration of First Mobile Terminal Test Apparatus]

The first mobile terminal test apparatus 2 outputs to, the device under test W, the data of the first test signal out of the data of the test signals including the first test signal and the second test signal. As shown in FIG. 1, the first mobile terminal test apparatus 2 includes a data generation unit 21, a data encryption unit 22, a data compression unit 23, a parameter adding unit 24, and a data output unit 25. Further, as shown in FIG. 1, the first mobile terminal test apparatus 2 has a first port 2a connected to a second port 3a, described later, of the second mobile terminal test apparatus 3 via a cable 5 (for example, a cable of category 6 of Ethernet® (data transmission amount: 1 Gbps)), and an output port 2b connected to an input port W1 of the device under test W via a cable 6.

The data generation unit 21 performs, for example, a throughput test of the device under test W according to a command from the control PC 4 to generate test signal data (for example, original data having a fixed pattern of All "0" and All "1") shared between the first mobile terminal test apparatus 2 and the second mobile terminal test apparatus 3, as test signal data to be output to the device under test W. For example, when the test signal output to the device under test W is 1.5 Gbps data including data A, B, C, D, and E, the 1.5 Gbps data including data A, B, C, D, and E is generated as test signal data.

The data encryption unit 22 encrypts the data of the test signal generated by the data generation unit 21, when the data encryption is defined in the communication standard. For example, when the data generation unit 21 generates 1.5 Gbps test signal data including data A, B, C, D, and E, the 1.5 Gbps test signal data including data A, B, C, D, and E is encrypted.

The data compression unit 23 compresses the data of the test signal encrypted by the data encryption unit 22 at a compression rate set in advance according to the data amount to shorten the data. For example, the 1.5 Gbps test signal data including data A, B, C, D, and E encrypted by the data encryption unit 22 is compressed to, for example, 0.1 Gbps test signal data (corresponding to the capacity of an incompressible area).

The parameter adding unit 24 adds a restoration parameter (for example, data length, presence or absence of compression, compression ratio, or the like) for restoring data, to the header of the compressed data compressed by the data compression unit 23. For example, when the 1.5 Gbps test signal data including data A, B, C, D, and E is compressed by the data compression unit 23 to 0.1 Gbps test signal data, the 0.1 Gbps compressed data is output of which header is added with a restoration parameter for restoring the remaining 1.4 Gbps test signal data (data before encryption) excluding the compressed data of the 0.1 Gbps test signal.

Under the control of the control PC 4, the data output unit 25 and the data output unit 34, to be described later, of the second mobile terminal test apparatus 3 perform monitoring of each other, and share the same test signal data (for example, 1.5 Gbps data A, B, C, D, and E). The data output unit 25 outputs only the data selected by the control PC 4, out of the data of the test signals encrypted by the data encryption unit 22, as the first test signal data, from the output port 2b in the order and the output timing designated by the control PC 4. For example, only the data (for example, data A and B) of the first test signal selected by the control PC 4, out of the data of test signals including the encrypted data A, B, C, D, and E, is output from the output port 2b in the order and output timing designated by the control PC 4.

[Configuration of Second Mobile Terminal Test Apparatus]

The second mobile terminal test apparatus 3 outputs the data of the second test signal to the device under test W out of the data of the test signals including the first test signal and the second test signal. As shown in FIG. 1, the second mobile terminal test apparatus 3 includes a data acquisition unit 31, a data restoration unit 32, a data encryption unit 33, and a data output unit 34. Further, as shown in FIG. 1, the second mobile terminal test apparatus 3 has a second port 3a connected to a first port 2a of the first mobile terminal test apparatus 2 via a cable 5 (for example, a cable of category 6 of Ethernet® (data transmission amount: 1 Gbps)), and an output port 3b connected to an input port W2 of the device under test W via a cable 7.

The data acquisition unit 31 acquires compressed data to which the restoration parameter has been added from the second port 3a via the cable 5 from the first port 2a of the first mobile terminal test apparatus 2, and performs a process for removing the restoration parameter from the acquired compressed data. For example, when the restoration parameter is added to the header of the 0.1 Gbps compressed data by the parameter adding unit 24 of the first mobile terminal test apparatus 2, the 0.1 Gbps compressed data with the header to which the restoration parameter is added is acquired from the second port 3a via the cable 5 from the first port 2a of the first mobile terminal test apparatus 2, and the restoration parameter is removed from the acquired compressed data.

The data restoration unit 32 restores the data of the test signal before encryption based on the restoration parameters removed from the compressed data acquired by the data acquisition unit 31. For example, when the data acquisition unit 31 acquires 0.1 Gbps compressed data to which a restoration parameter for restoring 1.4 Gbps test signal data before encryption is added, the 0.1 Gbps compressed data is unchanged, and the 1.4 Gbps test signal data before encryption is restored from the restoration parameter removed from the header of the compressed data.

When the data encryption is defined in the communication standard, the data encryption unit 33 encrypts the data of the test signal restored by the data restoration unit 32 (the encrypted compressed data and the restored data before encryption). For example, the encrypted 0.1 Gbps compressed data and the 1.4 Gbps test signal data before encryption are encrypted. Accordingly, the same 1.5 Gbps test signal data including data A, B, C, D, and E as the 1.5 Gbps test signal data including data A, B, C, D, and E encrypted by the data encryption unit 22 of the first mobile terminal test apparatus 2 is obtained.

Under the control of the control PC 4, the data output unit 34 and the data output unit 25 of the first mobile terminal test apparatus 2 perform monitoring of each other, and share the same test signal data (for example, 1.5 Gbps data A, B, C, D, and E) with each other. The data output unit 34 outputs only the data selected by the control PC 4, out of the data of the test signals encrypted by the data encryption unit 33, as data of the second test signal, from the output port 3b in the order and output timing designated by the control PC 4. For example, after the data (for example, data A and B) of the first test signal is output from the output port 2b of the first mobile terminal test apparatus 2, only the data (for example, data C, D, and E) of the second test signal selected by the control PC 4, out of the data of test signals including the encrypted data A, B, C, D, and E is output from the output port 3b in the order and output timing designated by the control PC 4.

[Configuration of Control PC]

The control PC 4 controls the entire components of the first mobile terminal test apparatus 2 and the second mobile terminal test apparatus 3, and sets the operation parameters, data rate, parameters required for encryption, or the like of the components of the first mobile terminal test apparatus 2 and the second mobile terminal test apparatus 3.

The control PC 4 controls the selection, the order, and the output timing of the data of the test signals output from the first mobile terminal test apparatus 2 and the second mobile terminal test apparatus 3.

For example, when data of test signals is output to the device under test W in the order of A→B→D→C→E, the control PC 4 controls the selection, order, and output timing of the data of the data output unit 25 of the first mobile terminal test apparatus 2 and the data output unit 34 of the second mobile terminal test apparatus 3 such that data A and B is selected as data of the first test signal from the data A, B, C, D and E of the test signals encrypted by the data encryption unit 22 of the first mobile terminal test apparatus 2 and output at predetermined output timings in the order of A→B, and then data C, D and E are selected as data of the second test signal from the data A, B, C, D and E of the test signals encrypted by the data encryption unit 33 of the second mobile terminal test apparatus 3 and output at predetermined output timings in the order of D→C→E.

[Operation of Mobile Terminal Test System]

Figure 2:
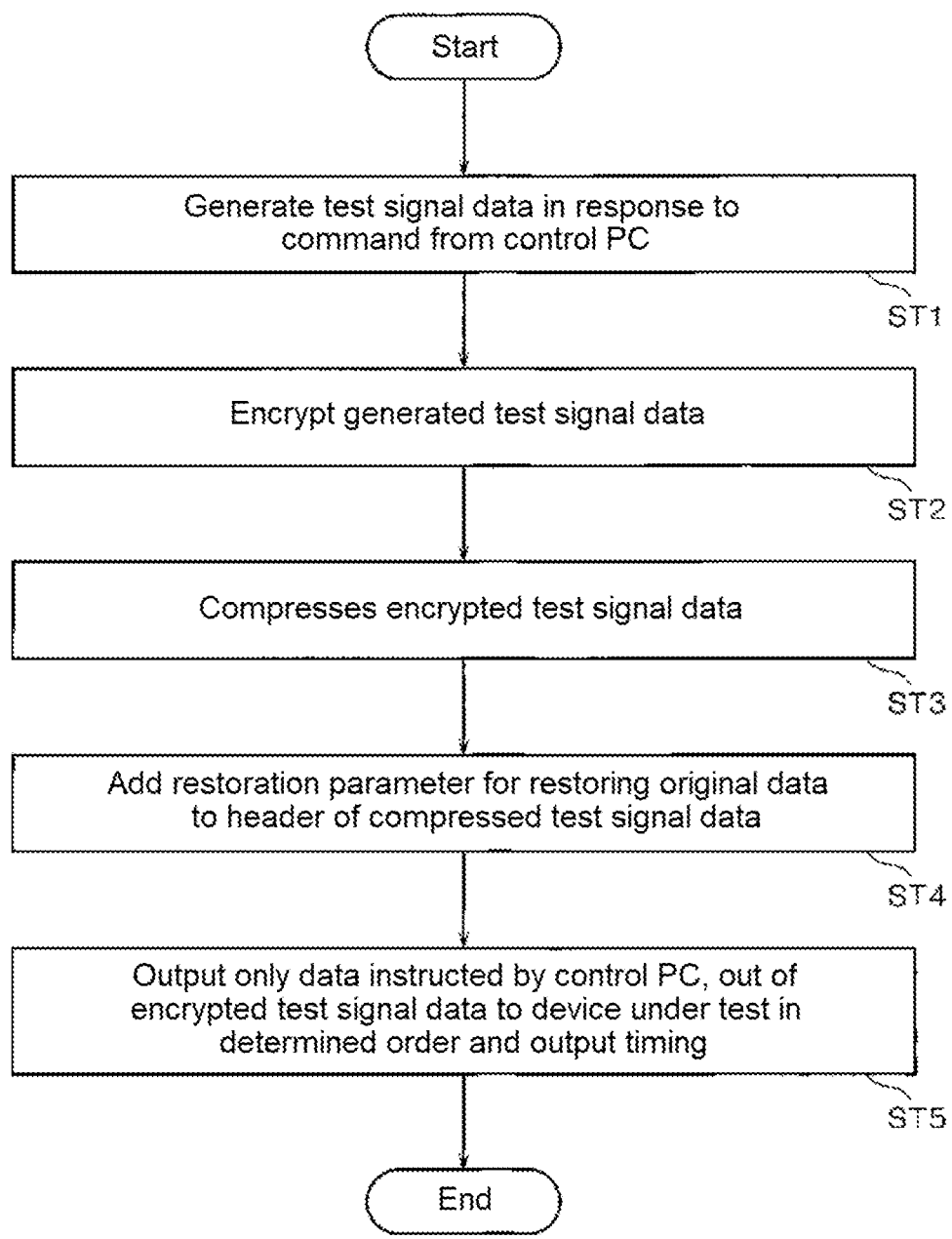
FIG. 2 is an operation flowchart of a first mobile terminal test apparatus in the mobile terminal test system according to the present invention.
Figure 3:
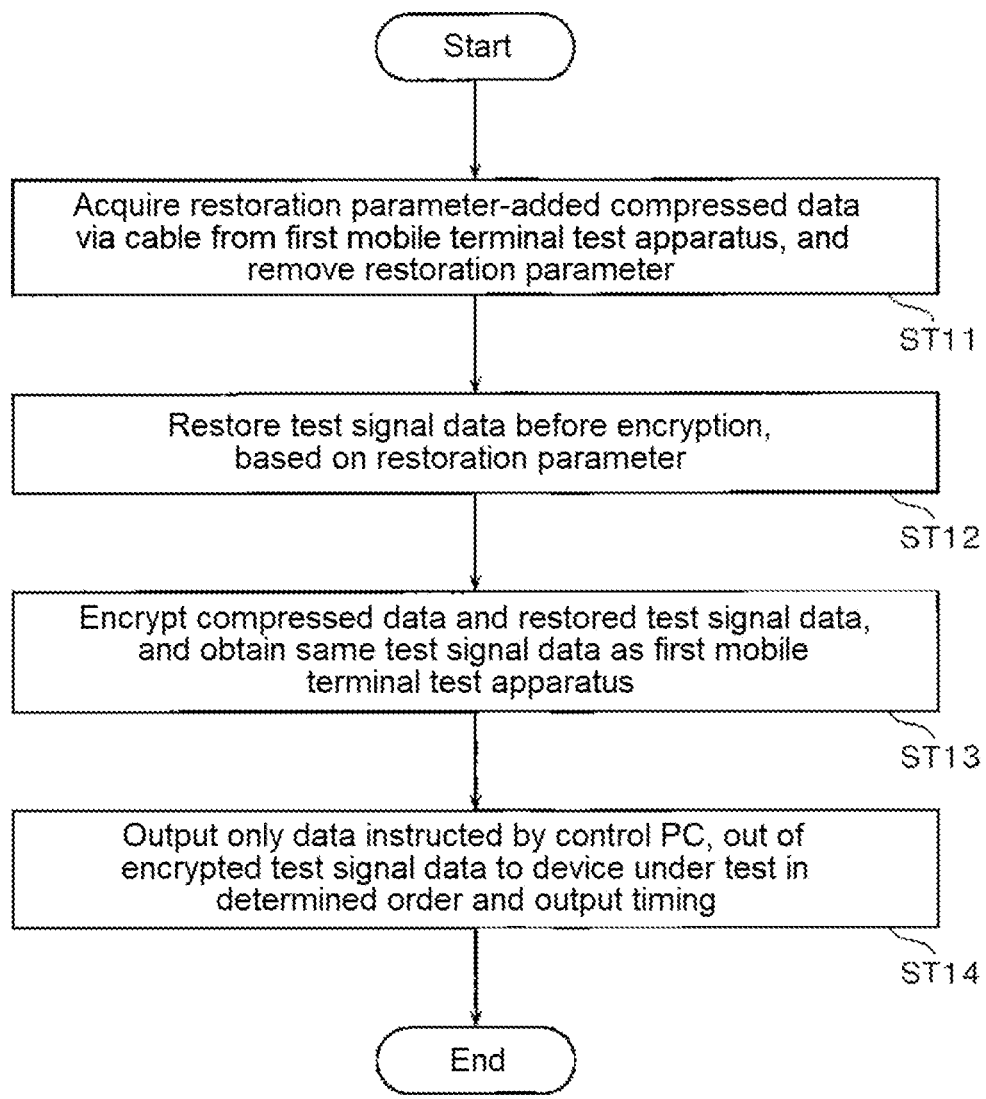
FIG. 3 is an operation flowchart of a second mobile terminal test apparatus in the mobile terminal test system according to the present invention.

Next, an operation in a case where a test is performed on the device under test W using the mobile terminal test system 1 configured as described above will be described with reference to FIGS. 2 and 3. Here, an example will be described in which 1.5 Gbps test signal data including A, B, C, D, and E is generated and output to the device under test W in the order of A→B→D→C→E.

In outputting the data of the test signals to the device under test W, the first port 2a of the first mobile terminal test apparatus 2 and the second port 3a of the second mobile terminal test apparatus 3 are connected via the cable 5.

Further, the output port 2b of the first mobile terminal test apparatus 2 and the input port W1 of the device under test W are connected via a cable 6, and the output port 3b of the second mobile terminal test apparatus 3 and the input port W2 of the device under test W are connected via a cable 7.

[Operation of First Mobile Terminal Test Apparatus]

When receiving a command to transmit a test signal from the control PC 4, the data generation unit 21 of the first mobile terminal test apparatus 2 generates 1.5 Gbps test signal data including A, B, C, D, and E, as test signal data (original data) for testing the device under test W, which is shared between the first mobile terminal test apparatus 2 and the second mobile terminal test apparatus 3 (ST1).

Subsequently, the data encryption unit 22 of the first mobile terminal test apparatus 2 encrypts the 1.5 Gbps test signal data including A, B, C, D, and E generated by the data generation unit 21 (ST2).

Next, the data compression unit 23 of the first mobile terminal test apparatus 2 compresses the 1.5 Gbps test signal data including A, B, C, D, and E which is encrypted by the data encryption unit 22 into the 0.1 Gbps test signal data (ST3).

Then, the parameter adding unit 24 of the first mobile terminal test apparatus 2 adds a restoration parameter for restoring the 1.4 Gbps original data to the header of the 0.1 Gbps compressed data compressed by the data compression unit 23 (ST4).

The compressed data to which the restoration parameter is added by the parameter adding unit 24 is input from the first port 2a to the second port 3a of the second mobile terminal test apparatus 3 via the cable 5.

The data output unit 25 of the first mobile terminal test apparatus 2 outputs only the data A, B as instructed by the control PC 4, out of the data of the test signals including A, B, C, D, and E generated by the data generation unit 21 and encrypted by the data encryption unit 22, as the data of the first test signal in the determined order (A→B) and output timing from the output port 2b to the input port W1 of the device under test W (ST5).

[Operation of Second Mobile Terminal Test Apparatus]

On the other hand, the data acquisition unit 31 of the second mobile terminal test apparatus 3 acquires 0.1 Gbps compressed data to which the restoration parameter is added by the parameter adding unit 24 that is input from the first port 2a of the first mobile terminal test apparatus 2 to the second port 3a via the cable 5, and removes the restoration parameter from the 0.1 Gbps compressed data to which the restoration parameter is added (ST11).

Next, the data restoration unit 32 of the second mobile terminal test apparatus 3 restores the 1.4 Gbps test signal data before encryption, based on the restoration parameters acquired by the data acquisition unit 31 (ST12).

Subsequently, the data encryption unit 33 of the second mobile terminal test apparatus 3 encrypts the 0.1 Gbps compressed data and the 1.4 Gbps test signal data restored by the data restoration unit 32, and obtains the same 1.5 Gbps test signal data including data A, B, C, D, and E as the 1.5 Gbps test signal data including data A, B, C, D, and E encrypted by the data encryption unit 22 of the first mobile terminal test apparatus 2 (ST13).

Then, after the data of the first test signal is output from the output port 2b of the data output unit 25 of the first mobile terminal test apparatus 2 to the input port W1 of the device under test W in the order of A→B and at the output timing, the data output unit 34 of the second mobile terminal test apparatus 3 outputs only the data C, D, and E as instructed by the control PC 4, out of the data of the test signals including A, B, C, D, and E encrypted by the data encryption unit 33, as data of the second test signal from the output port 3b to the input port W2 of the device under test W in the determined order (D→C→E) and output timing (ST14).

When the data of the above-described test signals (the first test signal and the second test signal) is output to the device under test W, the mobile terminal test system 1 determines whether or not the data received from the device under test W can be correctly restored according to the output of the data of the test signal.

[Configuration Between Each Mobile Terminal Test Apparatus and Device Under Test]

Incidentally, in the above-described embodiment, the case where the device under test W has two input ports W1 and W2, the input port W1 and the output port 2b of the first mobile terminal test apparatus 2 are connected to each other via the cable 6, the input port W2 and the output port 3b of the second mobile terminal test apparatus 3 are connected to each other via the cable 7, and the data of the test signal of the first mobile terminal test apparatus 2 and the data of the test signal of the second mobile terminal test apparatus 3 are transmitted to the device under test W by wire has been described as an example, but the present invention is not limited to this configuration. That is, the data of the first test signal of the first mobile terminal test apparatus 2 and the data of the second test signal of the second mobile terminal test apparatus 3 can be transmitted to the device under test W from the data output units 25 and 34 by wire or wirelessly.

As an example of transmitting the data of the test signal by wire, for example, when the device under test W has only one input port W1, a coupler (not shown) is provided between the data output unit 25 and the output port 2b of the first mobile terminal test apparatus 2, and the coupler and the input port W1 of the device under test W are connected via the cable 6. The data of the first test signal output from the output port 2b of the first mobile terminal test apparatus 2 and the data of the second test signal output from the output port 3b of the second mobile terminal test apparatus 3 are coupled by the coupler, and then transmitted to the device under test W via the cable 6 by wire.

Further, as an example of wirelessly transmitting the data of the test signal, when the device under test W has a transmission and reception function, the data of the first test signal output from the output port 2b of the first mobile terminal test apparatus 2 and the data of the second test signal output from the output port 3b of the second mobile terminal test apparatus 3 are coupled by the coupler (not shown), and then wirelessly transmitted to the device under test W from an antenna (not shown).

Further, when data encryption is not defined in the standard, the data encryption unit 22 of the first mobile terminal test apparatus 2 and the data encryption unit 33 of the second mobile terminal test apparatus 3 of FIG. 1 may be omitted in configuration.

As described above, according to the present embodiment, since it is possible to reduce the data transmission amount of a cable having a physically limited communication capacity, a plurality of mobile terminal test apparatuses can be connected without any problem, and a large-capacity throughput test can be realized.

The best mode of the mobile terminal test system according to the present invention has been described above, but the present invention is not limited by the description and drawings according to this mode. In other words, it is a matter of course that other modes, examples, operation techniques and the like made by those skilled in the art based on this mode are all included in the scope of the present invention.

DESCRIPTION OF REFERENCE NUMERALS AND SIGNS

1 Mobile Terminal Test System
2 First Mobile Terminal Test Apparatus
2a First Port
2b Output Port
3 Second Mobile Terminal Test Apparatus
3a Second Port
3b Output Port
4 Control PC
21 Data Generation Unit
22 Data Encryption Unit
23 Data Compression Unit
24 Parameter Adding Unit
25 Data Output Unit
31 Data Acquisition Unit
32 Data Restoration Unit
33 Data Encryption Unit
34 Data Output Unit
W Device Under Test

What is claimed is:

1. A mobile terminal test system comprising:
a first mobile terminal test apparatus that outputs a first test signal to a device under test;
a second mobile terminal test apparatus that outputs a second test signal to the device under test; and
a control PC that controls the first mobile terminal test apparatus and the second mobile terminal test apparatus,
the mobile terminal test system transmitting test signals including the first test signal and the second test signal to the device under test, wherein a first port of the first mobile terminal test apparatus and a second port of the second mobile terminal test apparatus are connected via a cable, wherein the first mobile terminal test apparatus includes
- a data generation unit that generates data of the test signals to be shared between the first mobile terminal test apparatus and the second mobile terminal test apparatus, in response to a command from the control PC,
- a data compression unit that compresses the data output from the data generation unit to create compressed data, and
- a parameter adding unit that adds, to a header of the compressed data, a restoration parameter for restoring the data and outputs the compressed data to the first port, wherein the second mobile terminal test apparatus includes
- a data acquisition unit that acquires the compressed data to which the restoration parameter is added, at the second port via the cable from the first port of the first mobile terminal test apparatus, and
- a data restoration unit that removes the restoration parameter from the restoration parameter-added compressed data acquired by the data acquisition unit, and restores the data of the test signals, based on the restoration parameter.

2. The mobile terminal test system according to claim 1, wherein the first mobile terminal test apparatus outputs, to the device under test, only data as instructed by the control PC, out of the data of the test signals generated by the data generation unit, as data of the first test signal, in a determined order and at an output timing, and wherein after the data of the first test signal is output from the first mobile terminal test apparatus to the device under test in the determined order and at the output timing, the second mobile terminal test apparatus outputs only data as instructed by the control PC, out of the data of the test signals restored by the data restoration unit, as data of the second test signal, to the device under test, in a determined order and at an output timing.

3. The mobile terminal test system according to claim 1, wherein the first mobile terminal test apparatus further includes a first data encryption unit that encrypts the data of the test signals generated by the data generation unit, wherein the data compression unit compresses the data of the test signals encrypted by the data encryption unit, and wherein the second mobile terminal test apparatus further includes a second data encryption unit that encrypts the data of the test signals restored by the data restoration unit.

4. The mobile terminal test system according to claim 3, wherein the first mobile terminal test apparatus outputs, to the device under test, only data as instructed by the control PC, out of the data of the test signals generated by the data generation unit and encrypted by the first data encryption unit, as data of the first test signal, in a determined order and at an output timing, and wherein after the data of the first test signal is output from the first mobile terminal test apparatus to the device under test in the determined order and at the output timing, the second mobile terminal test apparatus outputs only data as instructed by the control PC, out of the data of the test signals encrypted by the second data encryption unit, as data of the second test signal, to the device under test, in a determined order and at an output timing.

* * * * *